(12) United States Patent  
Roux et al.

(10) Patent No.: US 9,384,414 B2  
(45) Date of Patent: Jul. 5, 2016

(54) SEARCH FOR A TARGET IN A MULTISPECTRAL IMAGE

(71) Applicant: SAGEM DEFENSE SÉCURITÉ, Boulogne-Billancourt (FR)

(72) Inventors: Nicolas Roux, Paris (FR); Guillaume Letellier, Paris (FR); Hugues Berthaud, Paris (FR); Jacky Lavoise, Paris (FR); Michel Pealat, Paris (FR)

(73) Assignee: SAGEM DEFENSE SÉCURITÉ, Boulogne-Billancourt (FR)

( * ) Notice: Subject to any disclaimer, the term of this patent is extended or adjusted under 35 U.S.C. 154(b) by 0 days.

(21) Appl. No.: 14/357,205

(22) PCT Filed: Nov. 8, 2012

(86) PCT No.: PCT/EP2012/072194  
§ 371 (c)(1),  
(2) Date: May 8, 2014

(87) PCT Pub. No.: WO2013/068503  
PCT Pub. Date: May 16, 2013

(65) Prior Publication Data  
US 2014/0321753 A1    Oct. 30, 2014

Related U.S. Application Data

(60) Provisional application No. 61/655,748, filed on Jun. 5, 2012.

(30) Foreign Application Priority Data

Nov. 9, 2011    (FR) ...................................... 11 03408  
Jun. 5, 2012    (FR) ...................................... 12 55237

(51) Int. Cl.  
*G06K 9/46* (2006.01)  
*G06K 9/00* (2006.01)  
*G06K 9/62* (2006.01)

(52) U.S. Cl.  
CPC ............ *G06K 9/4661* (2013.01); *G06K 9/0063* (2013.01); *G06K 2009/00644* (2013.01); *G06K 2009/4666* (2013.01); *G06K 2009/6236* (2013.01)

(58) Field of Classification Search  
None  
See application file for complete search history.

(56) References Cited

U.S. PATENT DOCUMENTS

2010/0007751 A1* 1/2010 Icho et al. ................... 348/222.1  
2010/0092241 A1* 4/2010 Arshad ............................ 405/52  
2011/0007983 A1* 1/2011 Cho et al. ...................... 382/260

OTHER PUBLICATIONS

Minet et al, "Influence of band selection and target estimation error on the performance of the matched filter in hyperspectral imaging," Aug. 1, 2011, Applied Optics, vol. 50, No. 22, pp. 4276-4285.*

(Continued)

*Primary Examiner* — David F Dunphy  
(74) *Attorney, Agent, or Firm* — Marshall, Gerstein & Borun LLP

(57) ABSTRACT

A search for a target in a multispectral image is made more efficient and more user-friendly by combining a contrast optimization which is performed locally, with a presentation of a detection image which extends over the entire field of observation (10). The contrast is optimized inside a window (2) of reduced size relative to an image matrix (1) corresponding to the entire field of observation. This window may be moved in conjunction with the direction of observation (D), or it may be selected at will in the image matrix. The detection image may be renewed for each window used, or it may be shared by several windows.

19 Claims, 4 Drawing Sheets

(56) References Cited

OTHER PUBLICATIONS

Figure 1:
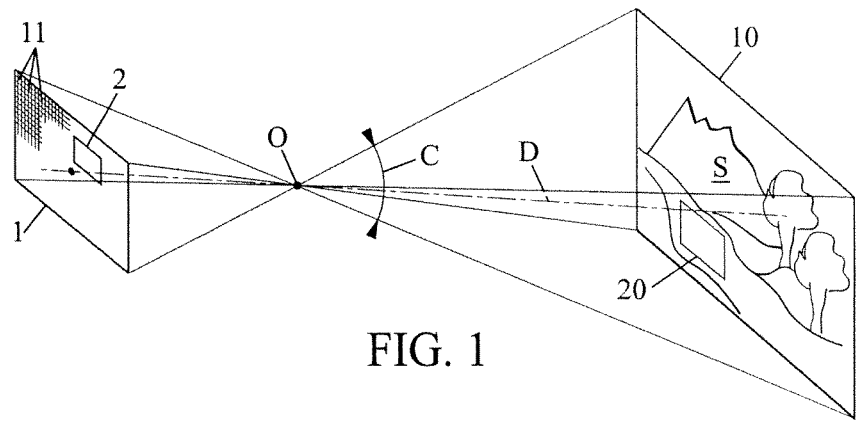

Bai et al, "Video SnapCut: Robust Video Object Cutout Using Localized Classifiers," 2009, ACM Transactions on Graphics (TOG), vol. 28, No. 3, pp. 1-11.*
Bhosle et al, "Multispectral panoramic mosaicking," 2005, Pattern Recognition Letters 26, pp. 471-482.*
Goudail et al, "Some practical issues in anomaly detection and exploitation of regions of interest in hyperspectral images," 2006, Applied Optics, vol. 45, No. 21, pp. 5223-5236.*
Jean Minet et al., "Influence of band selection and target estimation error on the performance of the matched filter in hyperspectral imaging", Applied Optics, Optical Society of America, Washington, DC, US, vol. 50, No. 22, Aug. 1, 2011, pp. 4276-4285.
Goudail F et al., "Some Practical Issues in Anomaly Detection and Exploitation of Regions of Interest in Hyperspectral Images", Applied Optics, Optical Society of America, Washington, DC, vol. 45, No. 21, Jul. 20, 2006, pp. 5223-5236.
Dimitris Manolakis et al., "Hyperspectral Image Processing for Automatic Target Detection Applications", The Lincoln Laboratory Journal, New York, NY, US, vol. 14, No. 1, Jan. 1, 2003, pp. 79-116.
Dimitris Manolakis et al., "Hyperspectral Subpixel Target Detection Using the Linear Mixing Model", IEEE Transactions on Geoscience and Remote Sensing, IEEE Service Center, Piscataway, NJ, US, vol. 39, No. 7, Jul. 1, 2001.
Dimitris Manolakis et al., "Detection Algorithms for Hyperspectral Imaging Data Exploitation (Presentation)", Adaptive Sensor Array Processing Workshop 2002, Mar. 12, 2002.
Sylvia S. Shen, "Optimal band Selection and Utility Evaluation for Spectral System", "Hyperspectral Data Exploitation: Theory and Applications", Apr. 6, 2007, Wiley-Interscience; 1 edition, pp. 227-243.
Chang Chein-I, "Information-Processed Matched Filters for Hyperspectral Target Detection and Classification" In: "Hyperspectral Data Exploitation: Theory and Applications", Apr. 6, 2007, Wiley-Interscience; 1 edition pp. 47-74.
International Search Report for Application No. PCT/EP2012/072194, dated Jan. 17, 2013.
Written Opinion for PCT/EP2012/072194, dated Jan. 17, 2013.

* cited by examiner

SEARCH FOR A TARGET IN A MULTISPECTRAL IMAGE

The present invention relates to a method for facilitating a search for a target in a multispectral image, as well as to a system and a computer program for implementing such method.

The monitoring of an environment is a common task, used in particular to detect hostile intrusions. Such monitoring presents special difficulties when it must be performed in a terrestrial environment. In fact, a terrestrial environment such as a rural environment may contain a large number of distinct elements which have irregular contours such as trees, bushes, rocks, buildings, etc., which complicate image interpretation and searching for intruding elements. These conditions are relevant in particular to Central European landscapes or semi-desert landscapes. In addition, under certain circumstances, especially in military applications, an intruding element may be camouflaged to make detection against the landscape more difficult. Commonly, such camouflage is effective under visible light, in particular with wavelengths in the range between 0.45 µm (micrometers) and 0.65 µm, and especially at about 0.57 µm, which corresponds to the maximum sensitivity of the human eye.

In order to successfully detect an intruding element, which will be called a target hereinafter in this description, despite a complex landscape and possible camouflaging of the target, it is known to use multispectral observation of the environment. Such multispectral observation consists of capturing several images of the same landscape in different spectral bands, so that a target which does not appear distinctly in the images captured at certain spectral bands will be revealed by images corresponding to other spectral bands. Each spectral band may be narrow, having a range of wavelength values of a few tens of nanometers, or wider, possibly up to a very large width of several micrometers, in particular when the spectral band is located in one of the infrared ranges: between 3 µm and 5 µm, or between 8 µm and 12 µm. It is thus known that observation in the wavelength range between 0.8 µm and 1.2 µm may be effective for revealing a target in an environment of vegetation, even when the target is efficiently camouflaged against detection through observation within the range of light which is visible to the human eye.

However, such a multispectral detection may still not be sufficient to allow an operator in charge of monitoring to detect the presence of a target in a terrestrial environment. In fact, under certain circumstances, none of the images which are separately associated with the spectral bands will show the target distinctly enough for the operator in charge of monitoring to detect the target in these images, given the time allotted for observation. Hereinafter, each image corresponding separately to one of the spectral bands will be called "spectral image." In these situations, it is also known that the efficiency of the target detection is improved by presenting to the operator an image constructed by Fisher projection. Such a method is know in particular from the article "Some practical issues in anomaly detection and exploitation of regions of interest in hyperspectral images," by F. Goudail et al., Applied Optics, Vol. 45, No. 21, pp. 5223-5236. According to this method, the image presented to the operator is constructed by combining at each point the separately stored intensity values for several spectral bands so as to optimize the contrast of the resulting image. Theoretically, this image construction consists of projecting for each point the vector of intensities stored for all the spectral bands, onto an optimal direction in the multidimensional space of spectral intensity values. This optimal direction of projection can be determined from the covariance matrix of spectral intensities, estimated for the entire field of the image. This is equivalent actually to searching for a maximum correlation between the intensity variations which are present in all the images captured in the different spectral bands. The contrast of the image presented to the operator is thus at least equal to that of each separate spectral image, so that target detection by the operator is both more efficient and more reliable. Alternatively, the optimal direction of projection may be searched for directly by using a conventional optimization algorithm in order to maximize the image contrast by varying the direction of projection in the multidimensional space of the spectral intensities.

Nevertheless, there are still conditions of target camouflage, landscape, and spectral signatures in which the contrast of the target in an image resulting from Fisher projection does not permit the operator to detect this target. In other words, the monitoring is neither sufficiently reliable nor effective: the probability of detection is still too low.

An object of the present invention is thus to increase the probability of detection of a target during the monitoring of an environment.

More specifically, the invention aims at presenting a monitoring image or portions of monitoring images in which the contrast of a target present in the field of observation is increased.

The invention also aims at improving comfort for an observer performing the monitoring, in order to improve his ability to discern a target in the imaged environment as well as to improve his efficiency in verifying whether a suspected target should be confirmed or rejected.

To this end, the invention provides a method for facilitating a search for a target in a multispectral image. The multispectral image comprises several spectral intensity values which relate respectively to several distinct spectral bands, for each point of an image matrix and for a same scene which is imaged on the image matrix for all the spectral bands. The method comprises the following sequence of steps, executed for an observation window which is smaller than the image matrix:

/1/ selecting the window in the image matrix;
/2/ selecting a direction of projection in a multidimensional space of the spectral intensities so as to optimize within the window a contrast of an intermediate image of the scene which is formed by using for each point in this window a projection of the spectral intensity values associated with this point onto the selected direction of projection; and
/3/ displaying a detection image corresponding to the entire image matrix, this detection image being produced, for the points located inside the window, from the intermediate image for the selected direction of projection, and supplemented for the points located outside the window so that the detection image represents the entire scene which is imaged.

The optimization in step /2/ is applied to a set of points of the image matrix, said set being limited to inside the window and comprising at least one point in this window. In this manner, one essential characteristic of the invention is the realization of a contrast optimization with Fisher projection within a limited part of an image, as opposed to an optimization applied to the complete image. In this manner, a dilution effect is avoided, which would otherwise reduce the contrast of the target in the image being presented to the monitoring operator, due to the contributions from parts of the image which are at a distance from the target and which have no spectral correlation with it. Below, "image matrix" denotes the set of image points at which spectral intensities are captured and stored, or pixels. The matrix thus corresponds to the entire field of observation, for a panoramic image which is captured cyclically or for a static image within a fixed field of observation. Each restricted window is therefore considered within the image matrix, or in an equivalent manner within the field of observation.

In addition, in step /3/, the content of the window which results from the optimization of step /2/ is presented to the monitoring operator in the detection image within a representation of the entire content of the field of observation. Such a presentation enhances the comfort of the monitoring operation for the operator.

The invention thus combines local contrast optimization with improved comfort for the monitoring operator. The overall efficiency of the search for potential targets is thus improved.

For each execution of the sequence of the steps, the detection image displayed in step /3/ may be identical to the intermediate image for the direction of projection which was selected in step /2/ for the window, at least for the points which are located within this window.

Optionally, the projection of spectral intensities in the multidimensional space, which is determined locally from the reduced window relative to the entire field of observation, may be applied only to this window within the detection image.

For the points located outside of this window, for each execution of the sequence of steps the detection image which is displayed in step /3/ may be supplemented with intensity values which correspond to one of the spectral bands, or to a merging of images respectively associated with several of these spectral bands, or to a continuous perception over a spectral range of light which is visible to the human eye.

In general, the method may be supplemented by an additional step /4/ in the sequence of steps, during which an image is displayed for verification to allow the operator to quickly eliminate any doubt about a potential target spotted in the detection image displayed in step /3/, inside the window. This verification image is obtained from a selection or a combination of spectral intensities which is different from that of the detection image, at least inside the window.

The contrast of the intermediate image which is optimized in step /2/ may be calculated for a central point in the window.

In the first variants of the invention, a center of the window may be fixed with respect to the image matrix, and multiple multispectral images are captured, respectively, in variable directions of observation. In this case, the content of the image inside the window varies with the direction of observation. The sequence of steps /1/ to /3/ or /4/ is then repeated for each direction of observation, and the direction of projection which is selected in step /2/ may be therefore different at least for two of the directions of observation used.

In the second variants of the invention, one window position may be variable within the image matrix, for the same multispectral image. The sequence of steps /1/ to /3/ or /4/ may then be repeated for several different window positions, and the direction of projection selected in step /2/ may be different for at least two window positions.

Each window or window position may be selected individually by a monitoring operator during a display of the multispectral image for one of the spectral bands, or for a merging of the images respectively associated with several spectral bands. Alternatively, each observation window may be selected by a scanning of the image matrix, which is performed automatically. This scanning may be limited to at least a portion of the image matrix, with displacements of one column or one row in this portion of the matrix between a new position and a previous position of the window. Optionally, the method of the invention may then comprise an additional step during which an anomaly search image is constructed and then presented to the monitoring operator. This anomaly search image may be constructed by associating each window position with the optimized contrast value obtained in step /2/ for the central point of the window in this window position.

In the third variants of the invention, in which the position of the window may be again variable within the image matrix for the same multispectral image, step /3/ may be carried out as a common step after several executions of the sequence of steps /1/ and /2/. As was the case in the second variants of the invention, the direction of projection which is selected in step /2/ may be different for at least two window positions. Step /3/ thus comprises the substeps listed below:

/3a/ combining the projections corresponding to the directions of projection which are respectively selected during the iterations of the sequence of steps /1/ and /2/, in order to obtain a combination of projections to be applied to the spectral intensity values associated with each point; and /3b/ displaying the detection image by applying the combination of projections to the spectral intensity values associated with each point, at least when that point is located inside the window used for one of the iterations of the sequence of steps /1/ and /2/.

In such third variants, the projections of spectral intensities which are determined locally for different reduced windows inside the field of observation may be applied to the entire image through the combination of projections. The detection image which is displayed thus represents the content of the entire field of observation all at once, but it is obtained from several separate contrast optimizations which were carried out locally. Such a comprehensive presentation of the content of the entire field of observation is even more favorable to increasing the effectiveness of monitoring performed by the operator.

The invention also relates to a support system for detecting a target in a multispectral image, which is designed to implement one of the methods described above. Such a system includes:

means for storing a multispectral image;
means for displaying an image;
means for selecting a window in the image matrix;
means adapted for selecting a direction of projection in the multidimensional space of the spectral intensities, so as to optimize inside of the window a contrast of an image formed for each point in this window by using a projection of the spectral intensity values which are associated with this point in the selected direction of projection, and
optionally, means for capturing the multispectral image, arranged to transmit the spectral intensity values to the storage means.

Finally, the invention also relates to a computer program product, which comprises program instructions stored on a medium which can be read by one or more processors, adapted to instruct this (these) processor(s) to execute one of the methods according to the invention which have been described above.

Figure 2:
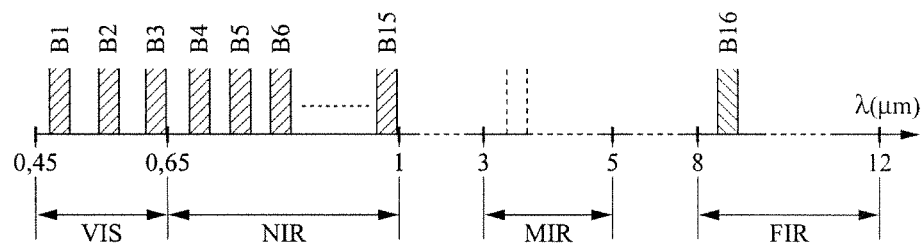
Figure 4A:
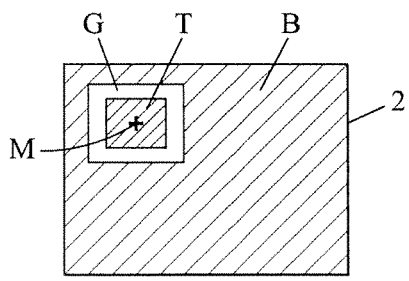
Figure 4B:
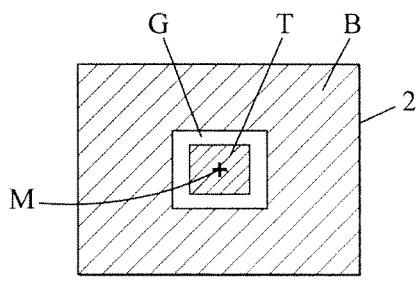
Figure 5:
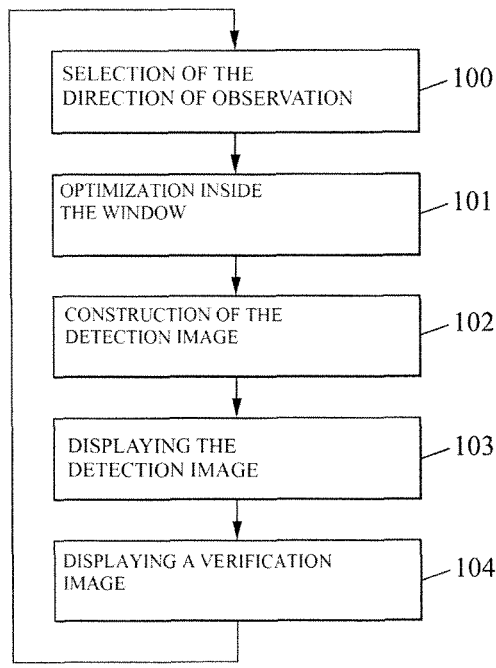
Figure 6:
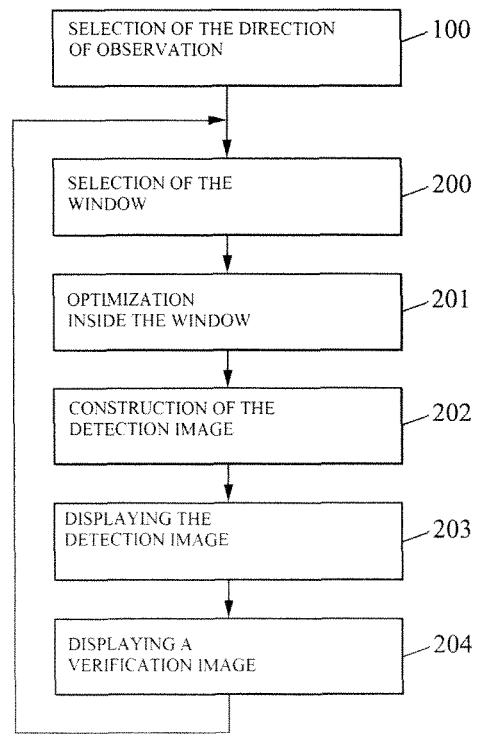
Figure 7:
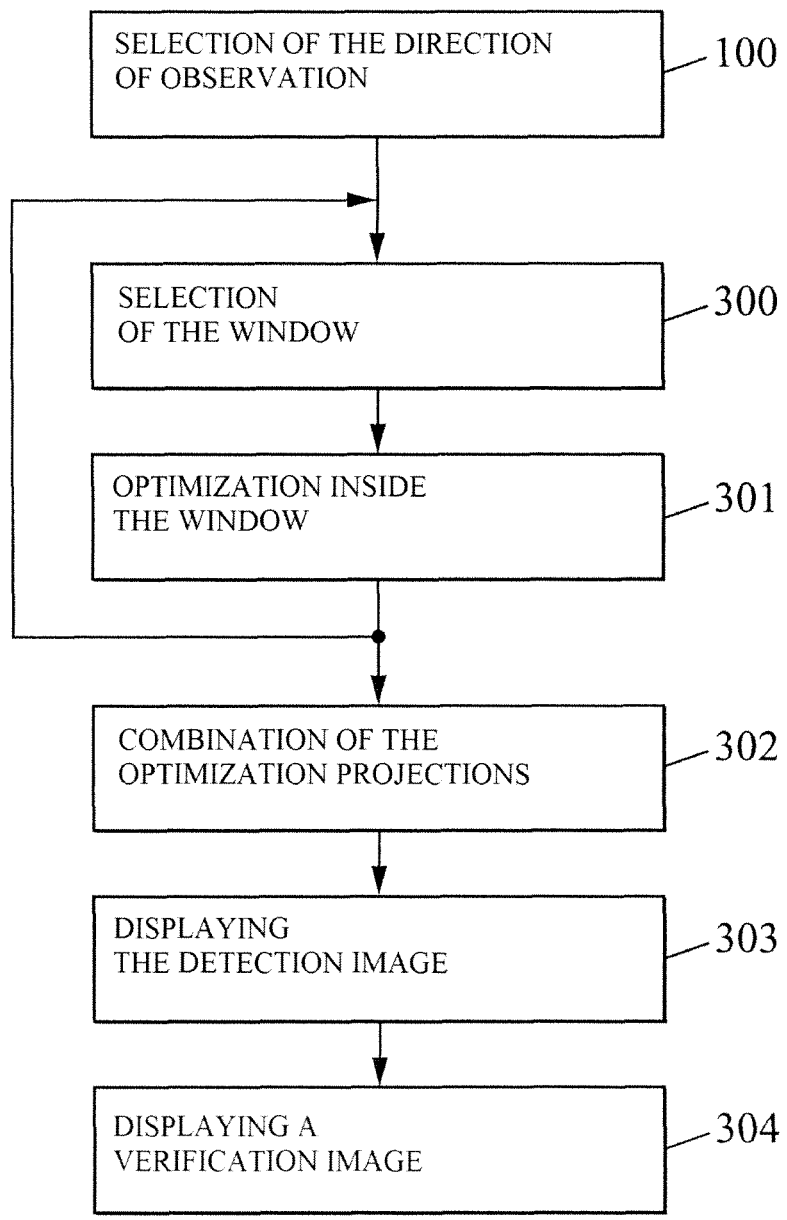

Other features and advantages of the present invention will become apparent from the following description of some non-limiting embodiments, with reference to the attached drawings, in which:

FIG. 1 illustrates an image captured within a field of observation, with a window used in a method according to the invention, FIG. 2 illustrates a distribution of spectral bands which may be used in a method according to the invention, FIGS. 3a to 3d show four window distributions possible for the methods according to the invention, FIGS. 4a and 4b illustrate a contrast calculation method which may be used with a method according to the invention; and FIGS. 5 to 7 are block diagrams for methods in accordance with three respective variants of the invention.

For the sake of clarity, the dimensions of the elements which are represented in these figures do not correspond to actual dimensions nor to ratios between actual dimensions. In addition, same reference symbols in different figures designate identical elements or elements having identical functions.

Moreover, although the invention will now be described in detail in the context of a static multispectral image which is captured inside a fixed field of observation, it is understood that it can be transposed by a person skilled in the art to a panoramic image which is captured cyclically, without difficulty or inventive contribution.

FIG. 1 shows the correspondence between an image matrix 1 and a field of observation 10. The scene S, which is contained in the entire field of observation 10, is imaged on the entire matrix 1. O symbolically denotes an optical center of an optical imaging element, not shown, which imposes the scene S on a photosensitive surface of an image sensor. C indicates an angular aperture of the field of observation 10, and D is the direction of observation, which corresponds in general to the optical axis of the optical imaging element. In addition, reference numeral 11 denotes photodetector elements of the photosensitive surface, which are distributed in rows and columns. In most cases, the surface of the photosensitive sensor can be considered to correspond to the image matrix 1, with the photodetectors 11 individually defining the image points of the matrix 1.

FIG. 1 shows the principle of capturing an image of the scene S for a spectral band. In order to implement the invention, this principle is repeated for several different spectral bands so as to obtain a multispectral image of the scene S. Since a person skilled in the art knows how to capture such a multispectral image, it is not necessary to describe the principle in detail here. Several spectral filters, arranged so as to alternate in front of the same photosensitive surface, can be used for this purpose, and/or several optical imaging elements juxtaposed in the same direction of observation and associated with different sensors, for distinct wavelength ranges of the radiation obtained from the scene S. Similarly, it is not necessary to describe here how images, which may have been captured with different image matrices for different spectral bands, can be converted in order to obtain a single common image matrix. This image matrix can contain 3,000×5,000 pixels, for example. In this manner, the multispectral image of the scene S associates respective spectral intensity values to all points of the image matrix 1, for each spectral band used.

As illustrated in FIG. 2, the spectral bands used and labeled B1 to B16 can be divided into the following three spectral ranges:

light visible to the human eye: between 0.45 µm and 0.65 µm, indicated as VIS,
near infrared: between 0.65 µm and 1 µm, indicated as NIR,
mid infrared: between 3 µm and 5 µm, indicates as MIR, and
far infrared: between 8 µm and 12 µm, indicated as FIR.

For example, at least sixteen separate spectral bands may be used, which are contained within the wavelength range extending between 0.4 µm and 12 µm. At least three of these spectral bands (B1 to B3) may be contained in the range of visible light VIS, at least twelve other of these spectral bands (B4 to B15) may be contained in the near infrared range NIR, and at least one more spectral band (B16) may be contained in the mid infrared range MIR or far infrared range FIR. Such a distribution of spectral bands has a higher concentration in the NIR range, where the spectral signatures of intruding camouflaged elements are often different from those of the plant components present in the scene. The method of the invention is thus particularly suitable for monitoring a terrestrial environment. In this case, but also in general, the multispectral image may be an image of a terrestrial landscape, in particular a Central European plant-covered landscape or a semi-desert landscape in which intrusion is suspected.

FIG. 1 also shows a window 2 which is contained within the image matrix 1, with the part 20 corresponding to the field of observation 10. To implement the present invention in a simple manner, the window 2 may be rectangular, with edges which are parallel to the lines and columns of the image matrix 1.

Figure 3A:
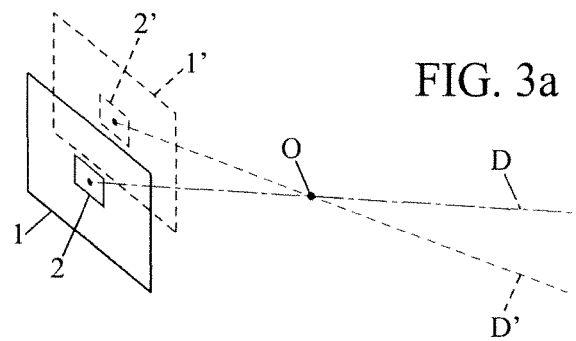

According to a first method for varying the content of the window 2, which is illustrated by FIG. 3a, a central point of the window 2 may be fixed relative to the image matrix 1, and the direction of observation D is moved relative to the scene S between two successive captures of multispectral images. D' indicates another possible direction of observation, which is different from D. The content of the image which is captured by the entire image matrix 1 is shifted accordingly, corresponding to the frame 1' which is offset relative to the initial position of the image matrix 1. The content of the image within the window 2 thus varies accordingly, together with the content of the image matrix 1. Reference numeral 2' denotes the window position associated with the direction D'. In this case, the center of the window 2 may be constantly the same as a center of the image matrix 1.

Alternatively, the window 2 may be at successive positions, which are variable in the image matrix 1, for the same multispectral image.

Figure 3B:
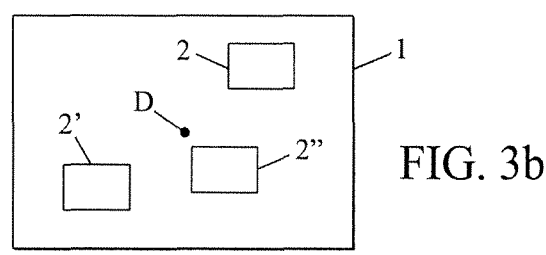

According to a second method for varying the content of the window, each observation window 2 may be selected individually by a monitoring operator during a display of a multispectral image for one of the spectral bands or for a merging of images respectively associated with several spectral bands. FIG. 3b thus shows several window positions denoted as 2, 2' and 2" inside the image matrix 1. In particular, each observation window can be selected individually by a monitoring operator during the display of a multispectral image with using a spectral band contained within the wavelength range of between 3 µm and 5 µm. Such a spectral band is adapted to reveal intruding elements which are hot, such as the engine compartment of a vehicle or combustion gas exhaust.

Figure 3C:
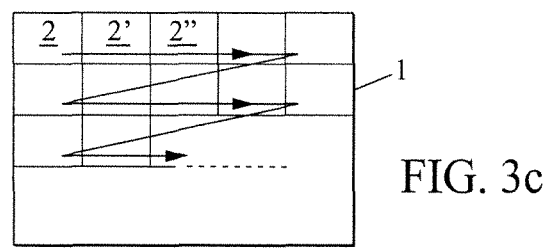

According to a third method for varying the content of the window, the window may be selected by an automatic scanning of the image matrix 1, as represented in FIG. 3c. The arrow indicates a possible order of the windows during scanning. In particular, the positions of windows 2, 2', 2" . . . may be side by side in the image matrix 1 with no overlap between two adjacent positions. This third method can be used for processing a single multispectral window, similarly to the second method.

Figure 3D:
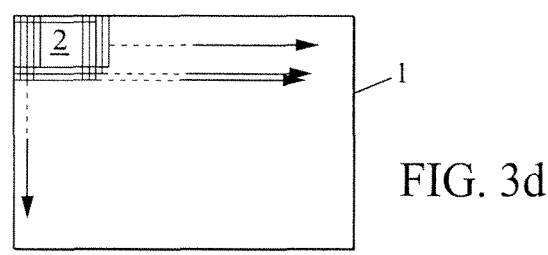

FIG. 3d shows a variant of the third method, in which the window 2 is varied by a gradual shift inside the image matrix 1 between two successive positions. For example, the next position of the window 2 can be shifted by one column or row of photodetector elements of the photosensitive surface in the image matrix 1, relative to the previous position of the window. The image matrix 1, or a portion thereof, can thus be scanned in a path formed of successive back and forth displacements. The center of the window 2 can travel across the entire image matrix 1 during this sweep. However, this travel of the center of the window may be limited to inside the image matrix 1, excluding a peripheral margin therein, in particular when the windows 2 has dimensions which remain constant for all successive positions. Such a limitation also makes it possible to avoid effects due to the edges of the image matrix 1 during subsequent use of the spectral intensity values respectively captured by all the photodetector elements.

Generally, in order to obtain an improvement in the contrast of a target potentially present in the image, all the windows 2 used according to the invention are smaller than the image matrix 1. The size of each window 2 may be variable or fixed, regardless of its position in the image matrix.

According to a further improvement of the invention, a size of each window 2 may be determined during the selection of the window, based on the dimensions of the areas in the multispectral image which are associated with different types of image content. In this manner, the window 2 may be contained in one of these areas which is associated with a single type of image content. Indeed, the assistance with searching for a target which is proposed by the invention is more effective when searching for a potential target inside an area of the image of fairly homogeneous image content. Therefore, the size of each observation window 2 may be adjusted so that the corresponding part in the scene S is only a portion of a meadow, or only a portion of forest border, or only a portion of intermediate bushes, or only a portion of scree. The operator thus prevents the window 2 from straddling areas of different types of image content, so that the background of the image inside the window has a fairly homogenous spectral signature. A possible target present in this part of the scene S will then be more distinct.

A contrast calculation method which may be used for each point in an image will now be described, with reference to FIG. 4a. In the context of the present invention, such a method may be applied to all the points located inside the window 2 that has been selected. A target area is defined around the point of calculation, indicated by M, and the contrast is calculated for this point between the points belonging to this target area and the points of a background area which is separate from the target area, inside the window. According to a further improvement of the calculation, a size of the target may be determined based on the assumed dimensions of the target being searched for, and optionally also based on the distance of a portion of the scene being imaged in the window, relative to the instrument which is used to capture the multispectral image. Such an estimate of the distance can be obtained by any known means of telemetry. In addition, the background area may be separated from the target area within the window by an intermediate separation area which surrounds the target area. In FIG. 4a, B indicates the background area, T indicates the target area for the point M for which the contrast is calculated, and G indicates the intermediate separation area, or gap. The gap makes it possible to prevent an intruding element present in the target zone from contributing to reducing the contrast value by overlapping the background area. For example, the target area T may have a size of 3×3 pixels, and the gap G may have an external size of 9×9 pixels when the window 2 has a size of 100×100 pixels. The target area T and the gap are preferably centered on the point M.

For each position of the direction of observation, for each window 2 or for each position of the window 2 in the image matrix 1, the contrast may be calculated at any point of the window 2, or only at a selection of points within the window. In particular, the contrast may be calculated only at the central point of the window 2 as illustrated by FIG. 2.

Such a contrast can be calculated at each point by using all the spectral intensity values recorded for one of the spectral bands, in order to form an image. In this manner, a different contrast value is obtained for each spectral band, corresponding to a sensitivity which will vary depending on the wavelength range. In addition, a resulting image can be also constructed from several images which each correspond to a different spectral band, and the contrast can be calculated at each point for the resulting image. Since such methods for merging, adding, or combining images are known to persons skilled in the art, it is not necessary to describe them again here.

Finally, it is also known that an image can be constructed by performing a linear combination of the spectral intensity values corresponding to different bands in order to optimize the image contrast which is obtained from the linear combination of spectral intensities. The linear combination which corresponds to such an optimization is that which shows the maximum correlation between the intensity values for the spectral bands used in the combination. It forms a projection of a vector of the spectral intensities for each pixel, onto an optimal direction of projection in the multidimensional space of these spectral intensities. This is the Fisher projection which was mentioned at the beginning of this description.

According to the invention, such a contrast optimization is performed only from spectral intensity values for the points located within each window, for several spectral bands of the spectral image. This optimization may be performed in order to improve the overall contrast in the entire window. For example, a merit function may be used which depends on the contrast values for all the points of the window, or for a selection of these points, and the value of this merit function is maximized for the Fisher projection.

Alternatively, the contrast value for a single point in each window, for example in the center of the window, may be used to determine the Fisher projection. In particular, when the window 2 is moved gradually in the image matrix 1 according to FIG. 3d, the contrast which is considered for determining the Fisher projection may be restricted to its value at the central point of the window for each window position. A new image can thus be constructed by assigning to each position of the window 2 the contrast value obtained for its central point by applying the Fisher projection determined for this window and the same central point therein. The new image is very sensitive to the presence of target(s), and it can be called a spectral anomaly search image for this reason. However, this spectral anomaly search image is not precise concerning the shape of each target, because its mode of construction applies a spatial filtering within the image matrix 1. Moreover, the concept of spectral similarity can also be at least partially lost, when the complete spectral anomaly search image is compared with the analysis using Fisher projection which is performed for each window.

Several variants for embodying of the invention will now be described with reference to FIGS. 5 through 7.

The first variant will be first described with reference to FIG. 5.

The direction of observation D is selected during the first step 100. The size of the image matrix 1, the magnification of the imaging optical element, and the direction of observation D which is selected together determine the content of the multispectral image in the entire image matrix 1. The window 2 is positioned in a fixed manner relative to the image matrix, for example in a central position as shown in FIG. 3a, and the content of the multispectral image in the window 2 is thus also fixed by the selected direction of observation. Optionally, the direction of observation D may be selected during a scan of the monitored environment by moving the field of observation 10 relative to the scene S. A variable image can thus be presented to the monitoring operator in real time during the scan. The operator then sets the direction of observation D when he wants to perform a more thorough detection. The accordingly limited portion 20 of the field of observation 10, which corresponds to window 2, contains the portion of the scene S which will be the object of more thorough detection.

Advantageously, the size of the window 2 may be also adjusted by the monitoring operator based on image areas which have different types of image content within the portion 20 of the field of observation 10, and as indicated above.

In step 101, the contrast of an image limited to the area within the window 2 is optimized when this limited image is formed from the effective intensity values obtained by projecting the spectral intensity values for each point of the window 2 onto a direction of projection in the multidimensional space of the spectral intensities. The spectral bands which are used for this optimization, meaning the bands whose intensities form independent axes of the projection multidimensional space, may be a subset of the spectral bands of the multispectral image. For example, this optimization step 101 may be carried out with bands in the VIS and NIR spectral ranges (see FIG. 2), with the exception of the band(s) contained in the ranges MIR and/or FIR. The optimization variable is the direction of projection in the multidimensional space. The new image of the portion 20 of the field of observation resulting from this is therefore obtained by projecting, for each point of the window 2, the vector of the spectral intensities of the bands used for the optimization, onto the direction of projection which provides the highest contrast in the window. This direction of projection which provides the best contrast corresponds to the Fisher projection, and is selected. An intruding element present in the portion 20 of the field of observation 10 and which has a different spectral signature than the background signature present in the relevant portion of the scene S, is thus clearly revealed in the window 2.

The next step 102 relates to the construction of the detection image which will be presented to the monitoring observer. This detection image corresponds to the whole scene S which was imaged on the entire image matrix 1, but it is obtained in two different ways depending on whether or not a point of the image matrix 1 is located within the window 2. For the points which are located in the window 2, the intensity value may be the value which results from the projection onto the direction which was selected in step 101 inside the multispectral space. For the points of the matrix image 1 which are located outside the window 2, the intensity which is used may be that of any of the spectral bands of the multispectral image, whether this band was used in step 101 or not. For example, the spectral band which is located in the MIR or FIR range may be used for the detection image outside of the window 2. Alternatively, a merging of the images which correspond to several of the spectral bands of the multispectral image, in particular those that are located within the VIS range, may be also used outside of the window 2. Such an image is commonly referred to as CDC (Color Day Channel). In another alternative, the detection image may be constructed outside of the window 2 by a display which corresponds to continuous perception over the entire VIS spectral range, close to direct human vision, which is commonly referred to as DOC (Direct Optical Channel). The detection image which is thus constructed is an insertion of the image obtained by the Fisher projection inside the window 2, within a complementary part of the image of the scene S. Such an insertion makes it possible for the operator to easily understand the content of the entire scene S, and to see in the scene the part 20 of the field of observation for which the contrast is optimized.

The detection image is displayed in step 103. Optionally, an intensity value that is also filtered may be used for each point in order to reduce or eliminate those of said intensity values which are smaller than a fixed threshold, at least for the points located inside the window 2.

Step 104 is optional and may be executed at the request of the operator. This step makes it possible for the operator to verify an intruding element, or target, which he spotted in the detection image in step 103. For this purpose, a new image of the scene S, called the verification image, is displayed at least for the points in the window 2. This verification image is separate from the one resulting from the Fisher projection, and it may be formed in one of the following ways:

/i/ by selecting one of the spectral bands of the multispectral image and using for each point of the window 2 the spectral intensity value associated with this point for the selected spectral band; or ii/ by selecting an additional spectral band, and using for each point of the window 2 the intensity value associated with this point for the additional spectral band; or /iii/ by selecting an additional spectral band, and the verification image is obtained for each point of the window 2 by merging the detection image displayed in step /3/ with an additional image formed by using an additional intensity value associated with the point for the additional spectral band.

The additional spectral band which is used in the alternatives /ii/ and /iii/ may be contained in the MIR and FIR wavelength ranges. It is then commonly referred to as THC (Thermal Channel). A potential target which has been detected in step 103 inside the window 2 can thus be either confirmed or abandoned.

Optionally, the method which is used to form the verification image within the window 2 may be applied to the whole image matrix 1. Alternatively, the verification image may be identical to the detection image for the points which are located outside of the window 2. In general, it is advantageous that the identification image represents the entire scene S which is contained in the field of observation 10 in order to facilitate recognition of the image content by the monitoring operation, in the same manner as with the detection image.

The method of FIG. 5 may be then repeated with changing the direction of observation D in order to monitor another portion of the environment.

The second variant of the invention which is illustrated by FIG. 6 differs from the preceding one (FIG. 5) in that the direction of observation D is fixed, but the window 2 is variable within the image matrix 1.

The first step 100 of selecting the direction of observation D is conducted in the same manner as above.

The second step, which is denoted 200, consists of selecting the window 2 in the image matrix 1. Such a selection may be performed as was already described in connection with FIG. 3b (selection by the monitoring operator), or in connection with FIG. 3c (selection during an automatic scan of the image matrix 1).

The next steps 201 through 204 respectively correspond to steps 101 through 104 which have been described for the first variant of an embodiment of the invention, and can be executed in the same manner. The size of the window 2 may again be adjusted advantageously by the monitoring operator based on the type of the content of the image in the part 20 of the field of observation 10.

After the step 203 or step 204, the method of FIG. 6 may be repeated from in step 200 in order to modify the window 2 within the image matrix 1, without changing the direction of observation D, so as to conduct a more thorough detection for an intruding element in another part of the same field of observation 10.

Finally, the third embodiment of the invention, which is shown in FIG. 7, differs from the preceding ones (FIG. 5 and FIG. 6) in that several optimizations of the projection in the multidimensional space of spectral intensities are first performed for several windows 2, and then used to construct a common detection image. This third variant uses a single multispectral image, as the second variant does. The direction of observation D is still fixed, and the window 2 is variable within the image matrix 1, so that the step 100 is again conducted in the same manner as above in order to set the direction of observation D.

Steps 300 and 301 respectively correspond to steps 200 and 201, but their sequence is repeated for several windows 2 which are selected successively inside the image matrix 1, for example according to FIG. 3b or 3c. One direction of projection in the multidimensional space of spectral intensities is thus obtained for each window 2, which maximizes the contrast in this window.

All corresponding Fisher projections are then combined in step 302 in order to obtain a combination of projections to be applied to the spectral values at each point of the image matrix 1. One such combination may comprise first a weighting of each projection based on the contrast which is obtained in the corresponding window. This may be a linear combination of the Fisher projections respectively retained for all the explored windows, with linear combination coefficients which depend on the location of the pixel in the image matrix 1. These coefficients, which vary between the different pixels, are preferably selected so that one of the Fisher projections will predominate in the result of the combination, for the pixels located in the windows that led to the direction of this projection. Between two neighboring windows in the detection image, the linear combination coefficients may vary progressively and continuously so that the combination is close to the mean of the Fisher projections which were determined for these windows, at a point that is substantially equidistant from each of the two windows. More generally, the linear combination coefficients of the Fisher projections for each point of the detection image may be based on the distances separating this pixel and a central point of each window. For example, Gaussian functions can be used for the coefficients weighting the Fisher projections in the linear combination, which depend on the distances between the pixel being considered and the central points of the windows. Finally, the combination of Fisher projections may again be multiplied by a conversion factor to adapt the total contrast of the image that results from the combination of projections.

The combination of projections which is thus constructed is preferably applied to all the pixels of the image matrix 1. However, it is alternatively also possible to supplement the detection image outside of all the windows as indicated for step 102 in FIG. 5.

The detection image is then displayed in step 303. The operator has a single image in which the contents of the selected windows are rendered with contrasts which were maximized separately for each of these windows. With only one image to inspect, the scene S can thus be very quickly monitored.

The verification step 304 is also identical to step 104, but it may simultaneously concern all the windows that were used.

It is understood that the embodiments of the invention which have been described in detail above may be adapted or modified while retaining at least some of the advantages that have been mentioned. With these advantages, a user of the invention will immediately see that it provides a comfort and efficiency of detection for the monitoring operator which have not been previously available. This efficiency and comfort result in particular from the contrast optimization which is performed locally within the image, in conjunction with the presentation in a single image of the entire scene contained within the field of observation.

The invention claimed is:

1. A method for facilitating a search for a target in a multispectral image, said multispectral image comprising several spectral intensity values relating respectively to several distinct spectral bands, for each point of an image matrix and for a same scene which is imaged on said image matrix for all the spectral bands, said method comprising the following sequence of steps, executed for an observation window which is smaller than the image matrix:

/1/ selecting the window in the image matrix;

/2/ selecting a direction of projection in a multidimensional space of the spectral intensities so as to optimize within the window a contrast of an intermediate image of the scene which is formed by using for each point in said window a projection of the spectral intensity values associated with said point onto the selected direction of projection, and /3/ displaying a detection image corresponding to the entire image matrix, said detection image being produced, for the points located inside the window, from the intermediate image for the selected direction of projection, and supplemented for the points located outside of the window so that said detection image represents the entire scene which is imaged, wherein the optimization in step /2/ is applied to a set of points of the image matrix, said set being limited to inside the window and comprising at least one point in said window, wherein for each execution of the sequence of steps, the detection image displayed in step /3/ is supplemented for the points located outside of the window with intensity values corresponding to one of the spectral bands, or with intensity values corresponding to a continuous perception over a spectral range of light which is visible to the human eye, and wherein the contrast optimized in step /2/ is calculated between points of a target area and points of a background area which is separate from said target area, inside of each window, by an intermediate separating area which surrounds said target area.

2. The method according to claim 1, wherein the sequence of steps further comprises the following additional step:

/4/ displaying a verification image inside the window, said verification image being formed in one of the following ways:

/i/ by selecting one of the spectral bands, and using for each point of the window the spectral intensity value associated with said point for the selected spectral band; or /ii/ by selecting an additional spectral band, and using for each point of the window the intensity value associated with said point for the additional spectral band; or /iii/ by selecting an additional spectral band, and the verification image is obtained for each point of the window by merging the detection image displayed in step /3/ with an additional image formed by using an additional intensity value associated with said point for the additional spectral band.

3. The method according to claim 2, wherein the additional spectral band is contained in the wavelength range extending between 3 μm and 5 μm, or between 8 μm and 12 μm.

4. The method according to claim 1, wherein a center of the window is fixed relative to the image matrix, and several multispectral images are respectively captured in variable directions of observation, and wherein the sequence of steps is repeated for different directions of observation, and the direction of projection selected in step /2/ separately for each direction of observation so that the directions of projection are capable of being different.

5. The method according to claim 1, wherein a window position is variable inside the image matrix for the same multispectral image, and wherein the sequence of steps is repeated for different window positions, and the direction of projection is selected in step /2/ separately is for each window position so that the directions of projection are capable of being different.

6. The method according to claim 5, wherein in step /1/, each observation window is selected individually by a monitoring operator during a display of the multispectral image for one of the spectral bands, or for a merging of the images respectively associated with a plurality of said spectral bands, or each observation window is selected by a scanning of the image matrix, which is performed automatically.

7. The method according to claim 6, wherein each observation window is selected individually by the monitoring operator during a display of the multispectral image using a spectral band contained in the wavelength range extending between 3 μm and 5 μm.

8. The method according to claim 6, wherein in step /1/, each observation window is selected automatically in the image matrix, by scanning at least a portion of said image matrix with displacements of one column or one row in this portion of the matrix between a new position and a previous position of the window.

9. The method according to claim 8, wherein an anomaly search image is constructed by associating with each window position an optimized contrast value obtained in step /2/ for a central point of said window in said position, and said anomaly search window is presented to a monitoring operator.

10. The method according to claim 1, wherein for each execution of the sequence of steps, the detection image displayed in step /3/ is identical to the intermediate image for the direction of projection selected in step /2/ for the window, at least for the points which are located inside said window.

11. The method according to claim 1, wherein the detection image displayed in step /3/ is formed by additionally using a filtered intensity value for each point, in order to reduce or eliminate those of said intensity values which are smaller than a fixed threshold, at least for the points which are located inside each window.

12. The method according to claim 1, wherein a size of each observation window selected in step /1/ is determined based on dimensions of the areas in the multispectral image which are associated with different types of image content, so that said window is contained in one of said areas which is associated with a single type of image content.

13. The method according to claim 1, wherein the contrast of the intermediate image which is optimized in step /2/ is calculated for a central point in the window.

14. The method according to claim 1, wherein a size of the target area is determined based on assumed dimensions of the target being searched for.

15. The method according to claim 14, wherein the size of the target area is further determined based on a distance of a portion of the scene being imaged in the window relative to an instrument which is used to capture the multispectral image.

16. The method according to claim 1, wherein the spectral intensity values of the multispectral image relate to at least sixteen separate spectral bands contained in the wavelength range extending between 0.4 μm and 12 μm, with at least three of said spectral bands being contained in the wavelength range extending between 0.45 μm and 0.65 μm, and at least twelve other of said spectral bands being contained in the wavelength range extending between 0.65 μm and 1 μm, and at least one more of said spectral bands extending at least partially between 3 μm and 5 μm or between 8 μm and 12 μm.

17. The method according to claim 1, wherein the multispectral image is an image of a terrestrial landscape.

18. A non-transitory computer-readable media having instructions stored thereon that, when executed by a processor, cause the processor to:

facilitate a search for a target in a multispectral image, said multispectral image comprising several spectral intensity values relating respectively to several distinct spectral hands, for each point of an image matrix and for a same scene which is imaged on said image matrix for all the spectral bands;

/1/ select the window in the image matrix;

/2/ select a direction of projection in a multidimensional space of the spectral intensities so as to optimize within the window a contrast of an intermediate image of the scene which is formed by using for each point in said window a projection of the spectral intensity values associated with said point onto the selected direction of projection; and /3/ display a detection image corresponding to the entire image matrix, said detection image being produced, for the points located inside the window, from the intermediate image for the selected direction of projection, and supplemented for the points located outside of the window so that said detection image represents the entire scene which is imaged, wherein the optimization in step /2/ is applied to a set of points of the image matrix, said set being limited to inside the window and comprising at least one point in said window, wherein for each execution of the sequence of steps, the detection image displayed in step /3/ is supplemented for the points located outside of the window with intensity values corresponding to one of the spectral bands, or with intensity values corresponding to a continuous perception over a spectral range of light which is visible to the human eye, and wherein the contrast optimized in step /2/ is calculated between points of a target area and points of a background area which is separate from said target area, inside of each window, by an intermediate separating area which surrounds said target area.

19. A method for facilitating a search for a target in a multispectral image, said multispectral image comprising several spectral intensity values relating respectively to several distinct spectral bands, for each point of an image matrix and for a same scene which is imaged on said image matrix for all the spectral bands, said method comprising the following sequence of steps, executed for an observation window which is smaller than the image matrix:

/1/ selecting the window in the image matrix;

/2/ selecting a direction of projection in a multidimensional space of the spectral intensities so as to optimize within the window a contrast of an intermediate image of the scene which is formed by using for each point in said window a projection of the spectral intensity values associated with said point onto the selected direction of projection, and /3/ displaying a detection image corresponding to the entire image matrix, said detection image being produced, for the points located inside the window, from the intermediate image for the selected direction of projection, and supplemented for the points located outside of the window so that said detection image represents the entire scene which is imaged, wherein the optimization in step /2/ is applied to a set of points of the image matrix, said set being limited to inside the window and comprising at least one point in said window, wherein for each execution of the sequence of steps, the detection image displayed in step /3/ is supplemented for the points located outside of the window with intensity values corresponding to one of the spectral bands, or with intensity values corresponding to a continuous perception over a spectral range of light which is visible to the human eye, and wherein a size of each observation window selected in step /1/ is determined based on dimensions of the areas in the multispectral image which are associated with different types of image content, so that said window is contained in one of said areas which is associated with a single type of image content.

* * * * *